United States Patent
Russell et al.

(10) Patent No.: US 6,582,542 B1
(45) Date of Patent: Jun. 24, 2003

(54) METHOD OF PRODUCING A CHANNELED WALL FLUID CONTROL APPARATUS

(76) Inventors: Mark C. Russell, 25325 - 106th Ave. E., Graham, WA (US) 98338; Sean P. Doyle, 9735 SW. 156th Pl., Beaverton, OR (US) 97007; Charles T. Russell, 25325 - 106th Ave. E., Graham, WA (US) 98338

( * ) Notice: Subject to any disclaimer, the term of this patent is extended or adjusted under 35 U.S.C. 154(b) by 120 days.

(21) Appl. No.: 09/611,710

(22) Filed: Jul. 7, 2000

Related U.S. Application Data
(60) Provisional application No. 60/142,676, filed on Jul. 7, 1999.

(51) Int. Cl.[7] .............................. B65H 81/00; B32B 3/20
(52) U.S. Cl. ....................... 156/156; 156/191; 156/192; 156/245; 264/262
(58) Field of Search ................................. 156/242, 245, 156/187, 191, 192, 156; 165/179, 180, 182–184; 29/890.01; 264/259, 261, 262, 267

(56) References Cited

U.S. PATENT DOCUMENTS

| | | | |
|---|---|---|---|
| 3,154,914 A | | 11/1964 | Stockel |
| 3,229,359 A | | 1/1966 | Kramer |
| 3,595,025 A | | 7/1971 | Stockel et al. |
| 3,632,243 A | | 1/1972 | Mott |
| 3,690,103 A | * | 9/1972 | Dederra et al. ............... 60/267 |
| 3,784,152 A | | 1/1974 | Garner et al. |
| 4,263,249 A | | 4/1981 | Mayumi et al. |
| 4,285,779 A | * | 8/1981 | Shiga et al. .................... 204/9 |
| 4,369,920 A | * | 1/1983 | Schmidt .................. 239/127.3 |
| 4,584,171 A | | 4/1986 | Niino et al. |
| 4,703,620 A | | 11/1987 | Niino et al. |
| 4,707,225 A | | 11/1987 | Schuler et al. |
| 4,942,653 A | | 7/1990 | Hawkinson |
| 5,012,853 A | | 5/1991 | Bihlmaier |
| 5,154,352 A | | 10/1992 | Buckreus |
| 5,223,158 A | | 6/1993 | Lizenby |
| 5,249,357 A | | 10/1993 | Holmes et al. |
| 5,375,325 A | | 12/1994 | Bales et al. |
| 5,473,817 A | | 12/1995 | Schnoor et al. |
| 5,575,067 A | | 11/1996 | Custer et al. |
| 5,851,564 A | | 12/1998 | Triandafilou |

OTHER PUBLICATIONS

Composite Materials Application for Liquid Rocket Engines, J. Lewis and J. Lin, *American Institute of Aeronautics and Astronautics, Inc.*, 1982 (4 page article).

\* cited by examiner

*Primary Examiner*—Michael W. Ball
*Assistant Examiner*—Todd J. Kilkenny
(74) *Attorney, Agent, or Firm*—Christensen O'Connor Johnson Kindness PLLC (57) ABSTRACT

A method of manufacturing a channeled wall fluid apparatus (2) is disclosed. The method includes the step of providing at least one rib (16) on one of either a liner (8) having a length or an interior surface of at least a first mold (18). The method also includes the step of placing the first mold around the liner to form a gap (78) between the first mold and the liner. A removable casting material (24) is inserted within the gap. The method also includes removing the removable casting material from within the gap to form at least one channel (14) extending at least a portion of the length of the liner.

23 Claims, 12 Drawing Sheets

METHOD OF PRODUCING A CHANNELED WALL FLUID CONTROL APPARATUS

This application claims the benefit of U.S. Provisional Patent Application Ser. No. 60/142,676, filed on Jul. 7, 1999, the disclosure of which is hereby incorporated by reference.

FIELD OF THE INVENTION

The present invention relates generally to a fluid control apparatus and, more particularly, to methods of manufacturing a channeled wall fluid control apparatus.

BACKGROUND OF THE INVENTION

Thrust nozzles for jet and rocket engines are used for the production of thrust by the combustion of a fuel and an oxidizing agent. As the fuel and oxidizing agent burn, the products of the combustion are expelled from the thrust nozzle, thereby creating thrust. Such engines are usually mounted on aircraft or spacecraft where thrust is used to increase, decrease, or maintain the craft's velocity in flight.

A by-product of the combustion process is the release of large amounts of heat. To aid in dissipating the heat generated and/or heating of an engine process fluid, the thrust nozzle can be constructed with cooling channels. Heat generated in the thrust nozzle is transferred to the fluid in the cooling channels by conduction, and conveyed away from the thrust nozzle by convection. Cooling channels aid in reducing heat related stresses exerted upon the thrust nozzle, as well as assist in the heating of engine process fluids, thereby increasing engine performance.

One method of manufacturing a channeled wall thrust nozzle was proposed in U.S. Pat. No. 4,942,653, issued to Hawkinson. The disclosed method includes the step of forming a mandrel having a converging-diverging shape. Longitudinally extending slots are then machined within the exterior surface of the mandrel. Channel separator ribs are placed within the longitudinal slots, such that channels are formed between adjacent pairs of separator ribs. The channels are then filled with a removable casting material and the outer surfaces of the separator ribs are machined to have a surface contour conforming to the desired shape of the outer cooling jacket.

An outer shell is then secured around and affixed to the separator ribs. The mandrel is separated and removed from the interior of the thrust nozzle. The exposed inboard surfaces of the separator ribs are machined, followed by the mounting of an inner housing shell to the inner surfaces of the separator ribs. The casting material within the cooling channels is then removed, thereby resulting in a channeled wall thrust nozzle.

Although such a method of forming channeled wall thrust nozzles is effective, it is not without its problems. First, such a method requires precision machining of the mandrel to create a plurality of longitudinal slots to receive the separation ribs. Second, each separation rib must be individually fitted into the longitudinal slots of the mandrel. Further, the interior and exterior surfaces of the separator ribs must be precision machined to produce surfaces that conform to the desired shape of the outer cooling jacket and inner nozzle liner. Finally, such a method also requires that the separation ribs be joined to both the outer cooling jacket and the inner nozzle liner. As a result, such a nozzle is both complex and expensive to manufacture.

Thus, there exists a need for manufacturing a channeled wall thrust nozzle, wherein cooling channels can be constructed with relatively high precision while avoiding costly and complex machining steps.

SUMMARY OF THE INVENTION

In accordance with the present invention, a method for manufacturing a channeled wall thrust nozzle is provided. The channeled wall thrust nozzle includes a thrust nozzle liner, a jacket, and at least one channel separation rib. The composite cooling jacket, channel separation rib, and thrust nozzle liner are situated so that the separation rib is positioned between the jacket and the nozzle liner, thereby forming a gap between the jacket and the nozzle liner. The gap allows the passage of a cooling fluid between the jacket and thrust nozzle liner in a heat exchange relationship with combustible gases flowing along the inner surface of the thrust nozzle liner.

The method of manufacture includes the steps of integrally forming at least one rib on either a thrust nozzle liner or an outer mold. The mold is placed around the thrust nozzle liner to form a gap between the thrust nozzle liner and the mold. The gap is filled with a removable casting material. The method also includes the steps of wrapping the thrust nozzle liner with a composite material, and removing the removable casting material to form at least one channel extending the length of the nozzle liner.

A thrust nozzle formed in accordance with the method of the present invention has several advantages over currently available methods. First, because the method of the present invention combines several manufacturing steps, it is economical. Because the separation ribs may be formed on either the thrust nozzle liner or mold, it is more versatile. Furthermore, because the method does not require machining after the formation of the cooling channels, it is less costly to manufacture. Also, such a nozzle is lighter in weight when compared to existing nozzles. Finally, a thrust nozzle formed in accordance with the present invention has fewer machined parts and, therefore, results in a further reduction in cost to manufacturer. Thus, a thrust nozzle formed in accordance with the method of the present invention is simpler to manufacture and, therefore, is economical to produce.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
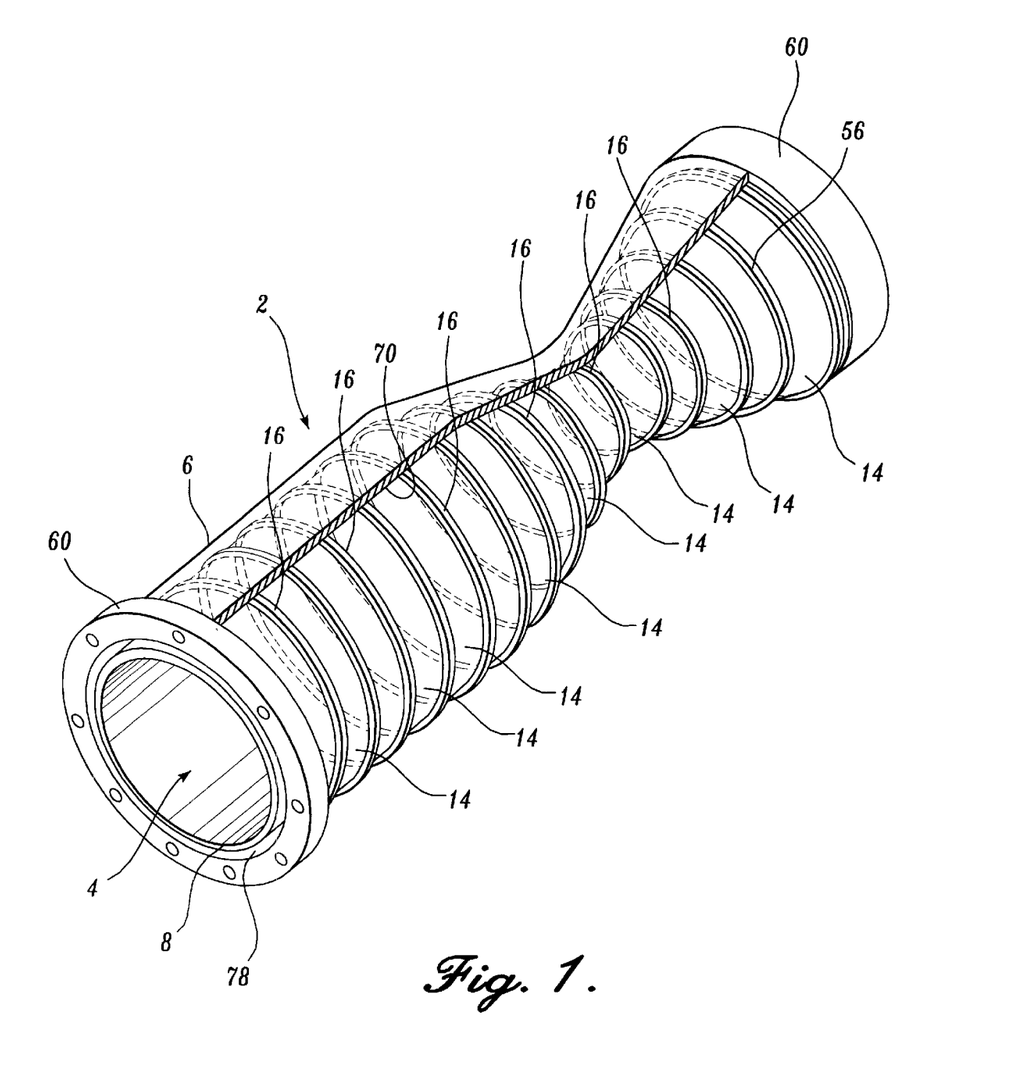
FIG. 1 is perspective view of a channeled wall thrust nozzle formed in accordance with one embodiment of the present invention showing a completed thrust nozzle with a cut-away of the cooling jacket.
Figure 2:
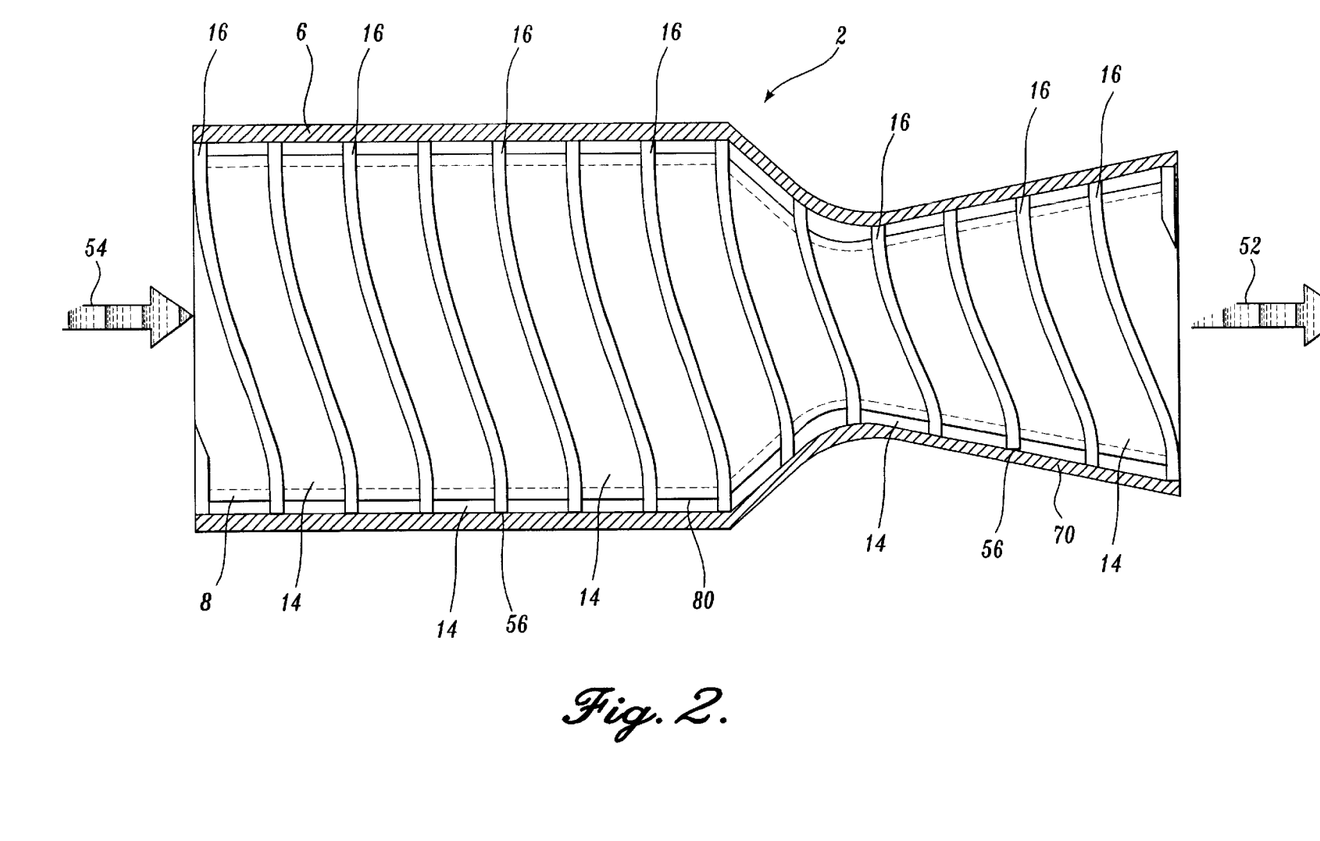
FIG. 2 is side planer view of a channeled wall thrust nozzle formed in accordance with one embodiment of the present invention showing a completed thrust nozzle with a portion of the cooling jacket removed for clarity.
Figure 3:
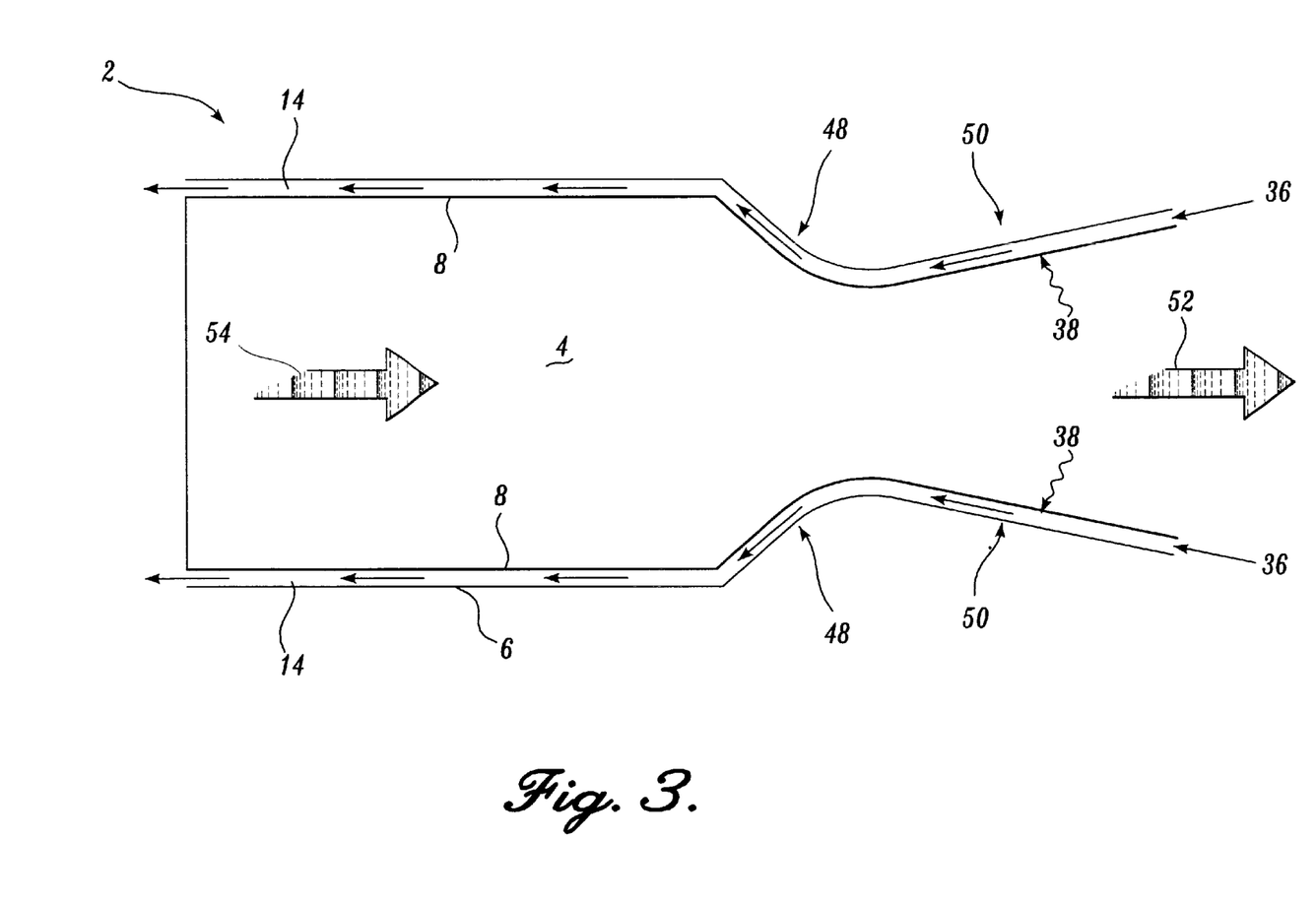
FIG. 3 is a cross-sectional view of a channeled wall thrust nozzle with a cooling jacket formed in accordance with one embodiment of the present invention with cooling fluid, combustion product and heat exchange flows depicted as would occur during typical operation.

FIGS. 1–3 illustrate a channeled wall thrust nozzle 2 formed in accordance with one method of the present invention. The channeled wall thrust nozzle 2 includes a cooling jacket 6, a thrust nozzle liner 8, and at least one separation rib 16. The thrust nozzle liner 8 is suitably formed from a high-strength and high-temperature material, such as stainless steel or Inconel™, and is formed such that it has both a converging portion 48 and a diverging portion 50. The thrust nozzle liner 8 is substantially a tubular structure and includes a combustion chamber 4. As is well known, thrust nozzles are typically used in jet or rocket engines and are designed to produce thrust by expelling the products of combustion 52 of a fuel and oxidizing agent 54.

Although the embodiment of the present invention is described as a thrust nozzle, the invention is not intended to be so limited. As a non-limiting example, the methods of manufacturing of the present invention may be used to produce heat exchangers or dampeners, such as a shock absorber. Thus, the use of a thrust nozzle is intended to be illustrative only and the methods are applicable to a wide range of channeled wall fluid control apparatus.

The cooling jacket 6 is suitably formed from a composite material, as is described in greater detail below. Although a cooling jacket 6 formed from a composite material is preferred, other thermally efficient materials, such as stainless steel or Inconel™, are also within the scope of the present invention. For purposes of the present invention, it should be apparent that the cooling jacket may include one or more of a shell 41, a shell 41 with an integral rib 16, and/or a composite material layer or layers.

The cooling jacket 6 is sized and shaped to conform with the shape of the thrust nozzle liner 8. Although a converging-diverging thrust nozzle 2 is preferred, other configurations, such as a straight and non-uniform geometry sections, are also within the scope of the present invention.

The separation rib 16 is typically formed through casting, machining, welding or bonding to one of the either the exterior surface of the thrust nozzle liner 8 or the interior surface of the cooling jacket 6, as is also described in greater detail below.

Still referring to FIGS. 1–3, the relationship between the separation rib 16, the cooling jacket 6 and the thrust nozzle liner 8 will now be described in greater detail. The separation rib 16 acts as a spacer between the thrust nozzle liner 8 and the cooling jacket 6. As such, the separation rib 16 separates the two layers so that a cooling fluid 36 may pass in the gap 78 formed between the layers in a heat exchange relationship with the hot products of combustion 52.

A channel 14 is formed in the gap 78 between the two layers as defined by the inner surface of the composite cooling jacket 6, the outer surface of thrust nozzle liner 8, and the sides of the separation ribs 16. A cooling fluid can be directed through channel 14 during operation of the thrust nozzle 2 in a heat exchange relationship with the products of combustion 52. Exit and inlet end fittings 60 are attached to the ends of the thrust nozzle 2 to function as manifolds in directing the fluids in and out of the cooling channels and to absorb, distribute or carry loads.

Operation of the thrust nozzle 2 may be best understood by referring to FIG. 3. During combustion of the fuel, an engine process fluid 36, such as fuel and/or an oxidizer, flows through the cooling channel 14 located in a circumferential array about the thrust nozzle. Recall that the outboard surface of the cooling channel 14 is defined by the inner surface of the composite cooling jacket 6, and the inboard surface defined by the outer surface of the thrust nozzle liner 8. Heat flows 38 from the hot combustion products, through the thrust nozzle liner 8, and into the cooling fluid 36 passing through the cooling channels 14. As a result, heat generated in combustion process is conveyed away from the thrust nozzle 2 and the engine process cooling fluid gains heat, aiding engine performance.

Referring to FIGS. 4–9, one method of manufacturing a thrust nozzle 2 in accordance with the present invention will now be described in greater detail. As best seen by referring to FIG. 4, dimensionally stable split male mandrels 62 are formed in a manner well known in the art. The exterior surfaces of each male mandrel 62 match the interior shape of the later formed cooling jacket 6. This desired shape is defined by the exterior surfaces 56 of the channel separation ribs 16 that contact the thrust nozzle liner 8. Further, such male mandrels 62 may be used to form a shell 41 (FIG. 7), as described in greater detail below.

Figure 4A:
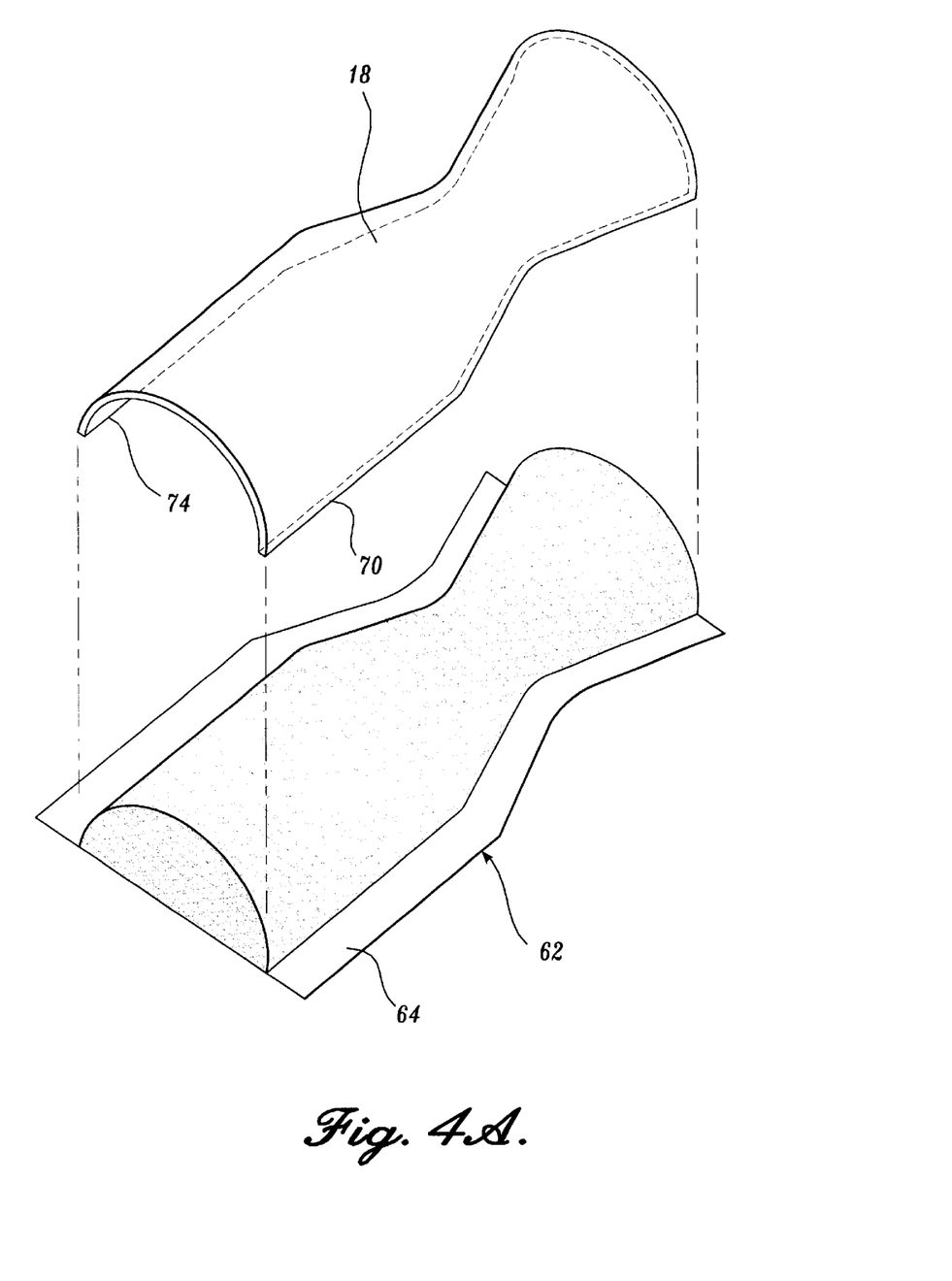
FIG. 4A is a perspective view of a male mandrel and the female mold or shell formed from the male mandrel, as the cured female mold or shell is lifted from the surface of the male mandrel.
Figure 4B:
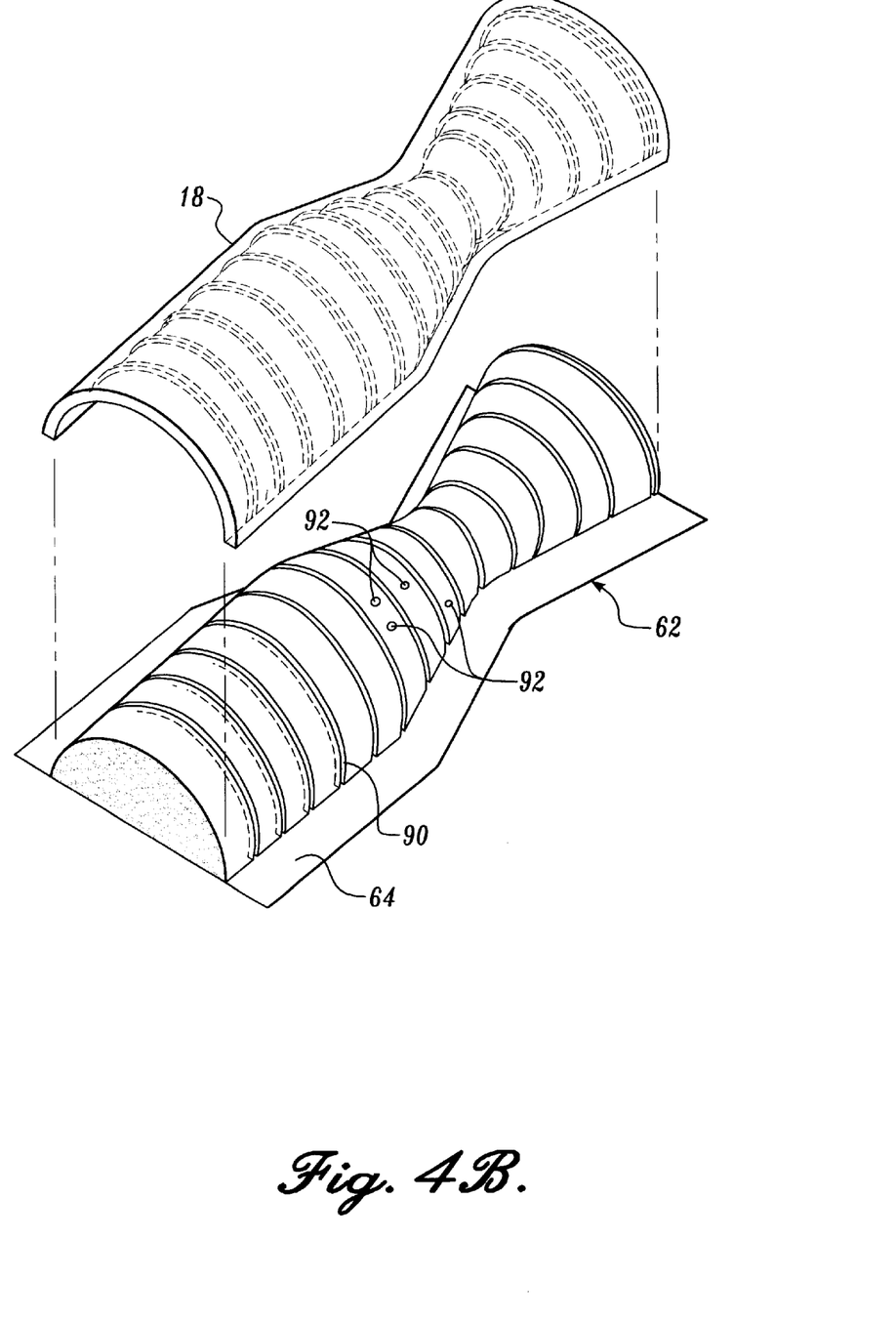
FIG. 4B is a perspective view of a male mandrel and the female mold or shell formed from the male mandrel and showing integral grooves and dimples on the male mandrel.
Figure 7:
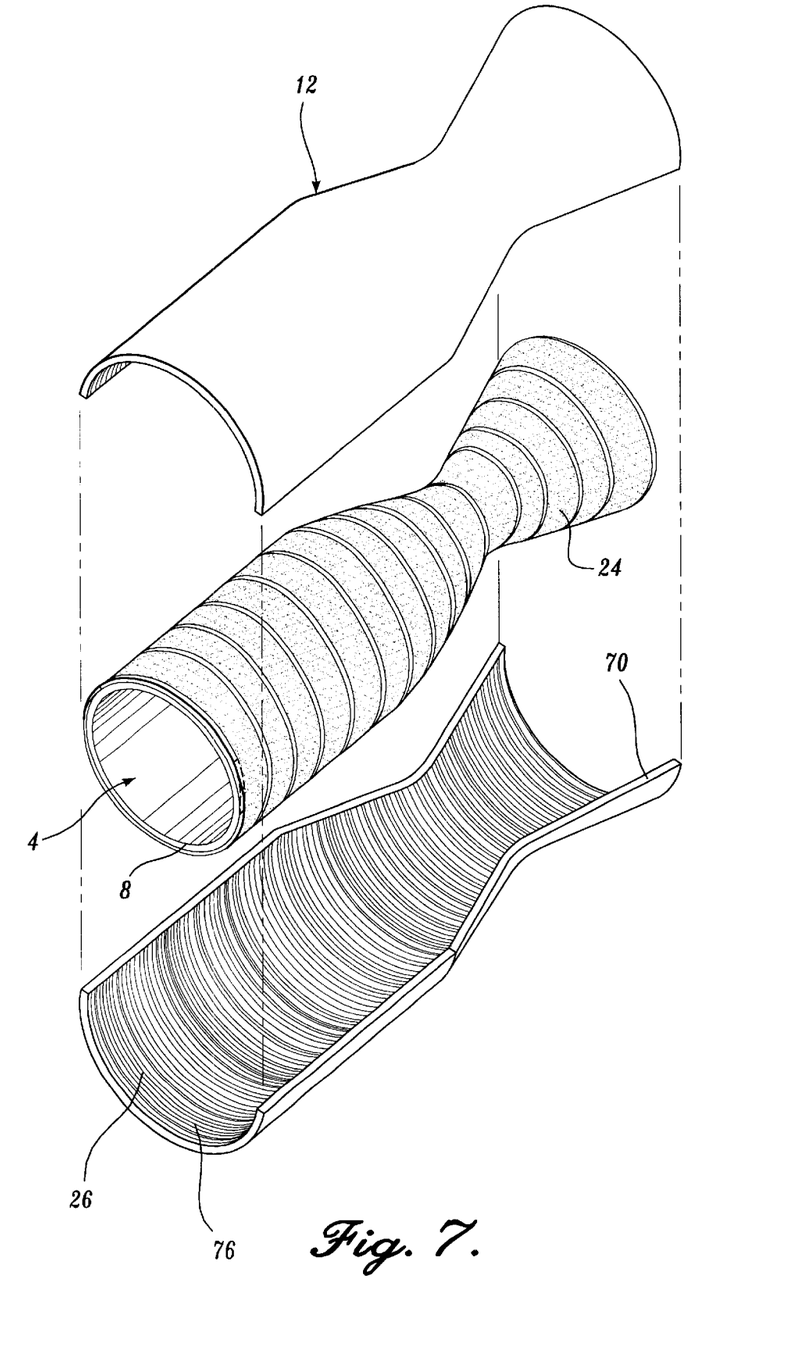
FIG. 7 is an exploded view of a channeled wall thrust nozzle formed in accordance with one embodiment of the present invention, showing the application of a structural housing with surface modifications to improve cooling fluid flow characteristics on a thrust nozzle liner having helical separation ribs with cured removable casting material in the cooling channels.

As may be best seen by referring to FIG. 4B, the male mandrels 62 may have grooves or riblets 90 or other surface modifications 92 embedded in or protruding from the surfaces of the molds to provide boundary layer fluid control mechanisms on the inner surface of structures formed from such designed male mandrels 62. The surface modifications 92 are illustrated as dimples. However, other embodiments, such as thin grooves and bumps, are also within the scope of the present invention. One embodiment of a shell 12 formed from the male mandrel 62 having surface modifications is shown in FIG. 7.

Referring back to FIG. 4A, the male mandrels 62 may have a flange 64 projecting outward around the perimeter of the male mandrel's base. This flange 64 aids in creating a precision surface on a structure formed on the male mandrel. As a non-limiting example, the flange 64 is used to create a longitudinally extending contact surface 70 on a female mold 18. The contact surface 70 is the surface upon which opposing halves of a female mold 18 or shell 41 contact each other when placed around the thrust nozzle liner 8 and pressed together.

From these male mandrels 62, female split molds 18 are produced which match the desired interior dimensions of the cooling jacket 6 walls. The female molds 18 are formed, in one embodiment, by applying composite materials over the male mandrel. The composite materials are cured and the hardened female mold 18 is then separated from the male mandrel 62. Although a female mold formed from composites is preferred, other materials and methods of forming the female mold, including electrodeposition, machining, and metal pressure forming, are also within the scope of the present invention.

As briefly noted above, the male mandrels 62 may have grooves or riblets embedded in or protruding from the surface of the male mandrels to provide boundary layer fluid control mechanisms on the inner surface of the ensuing castings taken from the male mandrels 62. Such grooves or riblets may also be machined on the surface of the female molds or they may be products from casting the female molds from the male mandrels 62 casting process, as previously described. Although the formation of female molds 18 was described using the male mandrels 62, shells 12 can be formed using a substantially similar method, as described in more detail below.

Figure 5:
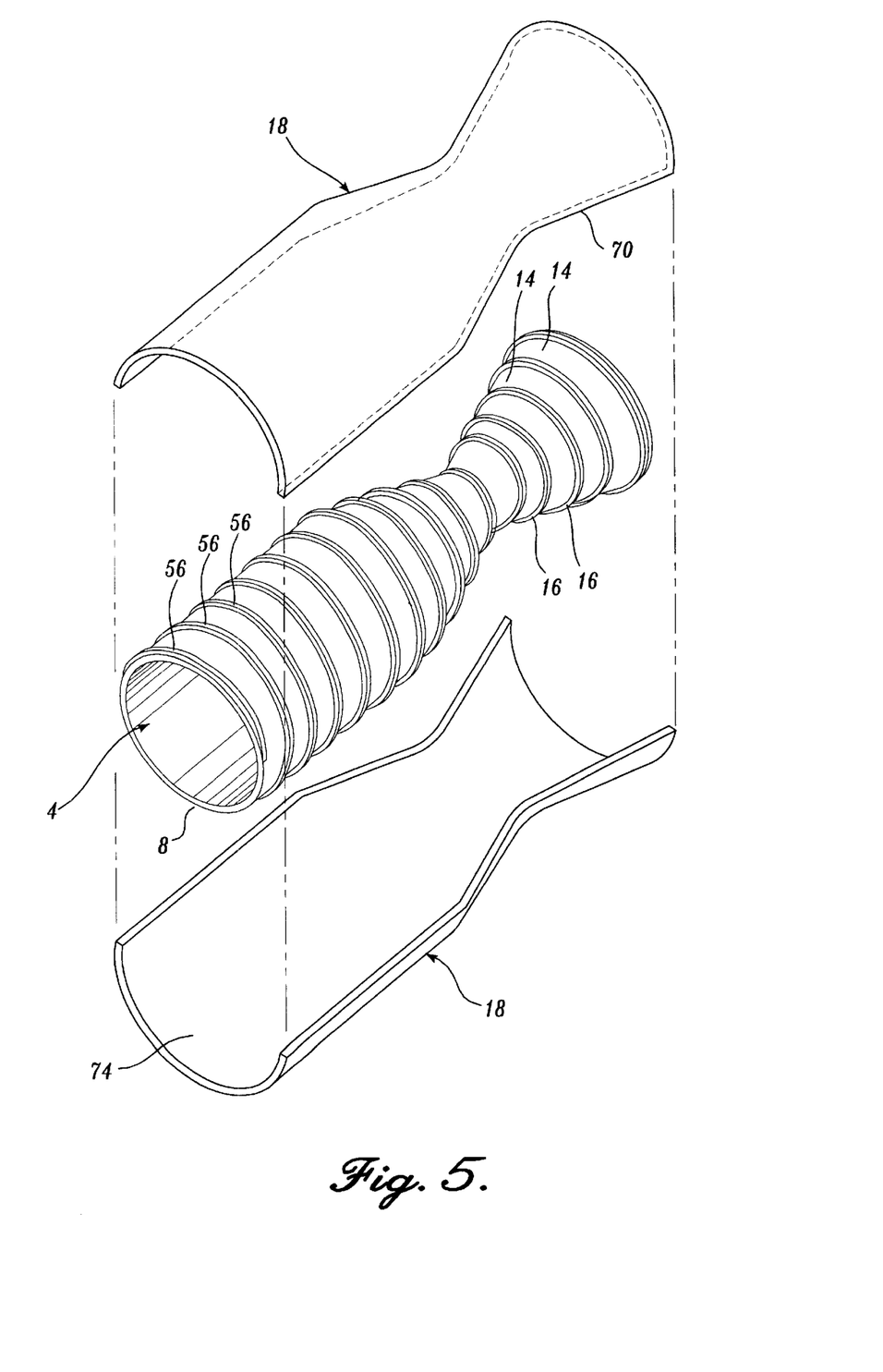
FIG. 5 is an exploded view of a channeled wall thrust nozzle liner formed in accordance with one embodiment of the present invention, depicting the thrust nozzle liner with helical separation ribs prior to enclosure with the female molds.

Referring now to FIG. 5, coupling of the female molds 18 to the thrust nozzle liner 8 will now be described in greater detail. The thrust nozzle liner 8 may be formed by a well known process, such as metal spinning. During such a process a metal tube is placed around a split male mandrel having a converging-diverging cross-section (not shown). The metal tube and male mandrel are spun as an inward force is applied, causing the metal tube to form to the shape of the male mandrel, thereby forming the thrust nozzle liner 8. In another embodiment, composite fiber material and resin are placed over the mandrel to the form the nozzle liner. Separation ribs 16 of a suitable material, such as steel, composite material or copper, are then attached to the exterior surface of the thrust nozzle liners 8. In other embodiments, thrust nozzle liners 8 with integral separation ribs 16 are formed through well known methods, such as machining, casting or through electrodeposition techniques.

Still referring to FIG. 5, the opposing halves of the female mold 18 are placed into contact with the helical channel separation ribs 16 outer surfaces 56. The opposing halves of the female mold 18 contact each other along the longitudinal contact surface 70. The opposing halves are temporarily joined together through bonding along the longitudinal contact surface 70 or by mechanical means such as by removable fastening bands around the two halves, holding the two halves of the female molds 18 together.

In performing this process, continuous cooling channels 14 of a helical orientation are formed between the inner converging-diverging thrust nozzle liner 8, the channel separation ribs 16, and the female split molds 18. The flexibility of the composite split molds 18 in this portion of the process allows for correct placement of the female split molds 18 in relation to the inner nozzle liner 8 even in the case of an imprecise inner nozzle liner 45 or an imprecisely formed female split mold 18. Therefore, this process is robust in the real-world manufacturing environment for it allows for flexibility in tolerance requirements.

Figure 6:
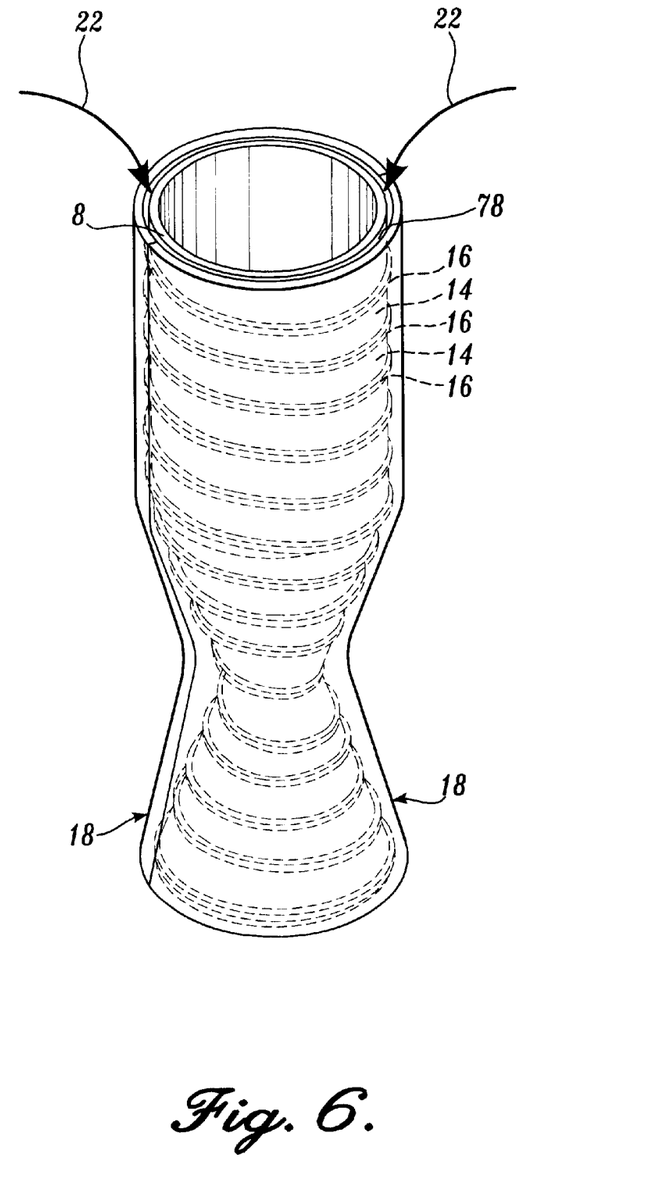
FIG. 6 is a perspective view of a channeled wall thrust nozzle formed in accordance with one embodiment of the present invention, depicting the thrust nozzle liner with female molds in contact with the separation rib and the pouring of the removable casting material into the cooling channels.

Referring now to FIG. 6, a removable casting material 24 is poured 22 into the gap 78 formed between the female split molds 18, the inner nozzle liner 8, and the channel separation ribs 16. The removable casting agent 24 filters down through the cooling channels 14, filling the space defined by the inner surface 74 of the female mold 18, the outer surface 80 of the thrust nozzle liner 8, and the sides of the separation ribs 82. The removable casting material is then allowed to cure in place.

The female split molds 18 are removed leaving a surface of predetermined shape defined by the outer surface of the hardened removable casting material 24 and the outer surfaces of the separation ribs 56. The purpose of the solidified removable casting material is to provide a surface upon which the inner surface of the cooling jacket 6 can be formed and that is capable of withstanding the compression forces exerted on the structure during the application of the composite materials 28 (FIG. 9) used in forming the cooling jacket 6 (FIG. 1).

Depending on the type of composite material system used, type of curing process (temp, pressure, etc.) and the type of removable casting material, a post-cure stage may be needed for the removable casting material. For example, if high temp curing Graphite/Epoxy pre-preg will be used and Easy-Out™ casting plaster will be the casting material, a high temp post-cure is needed to remove the water content in the Easy-Out™ before proceeding. If a room temp cure Graphite/Epoxy will be used with a casting wax (Paraffin), then no additional post-cure of the casting material is required.

Referring next to FIG. 7, depending on the type of composite material system used, curing process (temp, pressure, etc.) and the type of removable casting material 24, a set of shells 12, of either a structural or thin non-structural variety, may be needed to provide a resin-to-casting agent barrier and/or increase strength of the resulting structure. For example, if high temp curing Graphite/Epoxy pre-preg will be used and Easy-Out™ casting plaster will be the casting material, thin, non-structural split shells 12 will be required. If a room temperature cure Graphite/Epoxy will be used with a casting wax (Paraffin), then split shells 12 are an option.

Figures 8, 9:
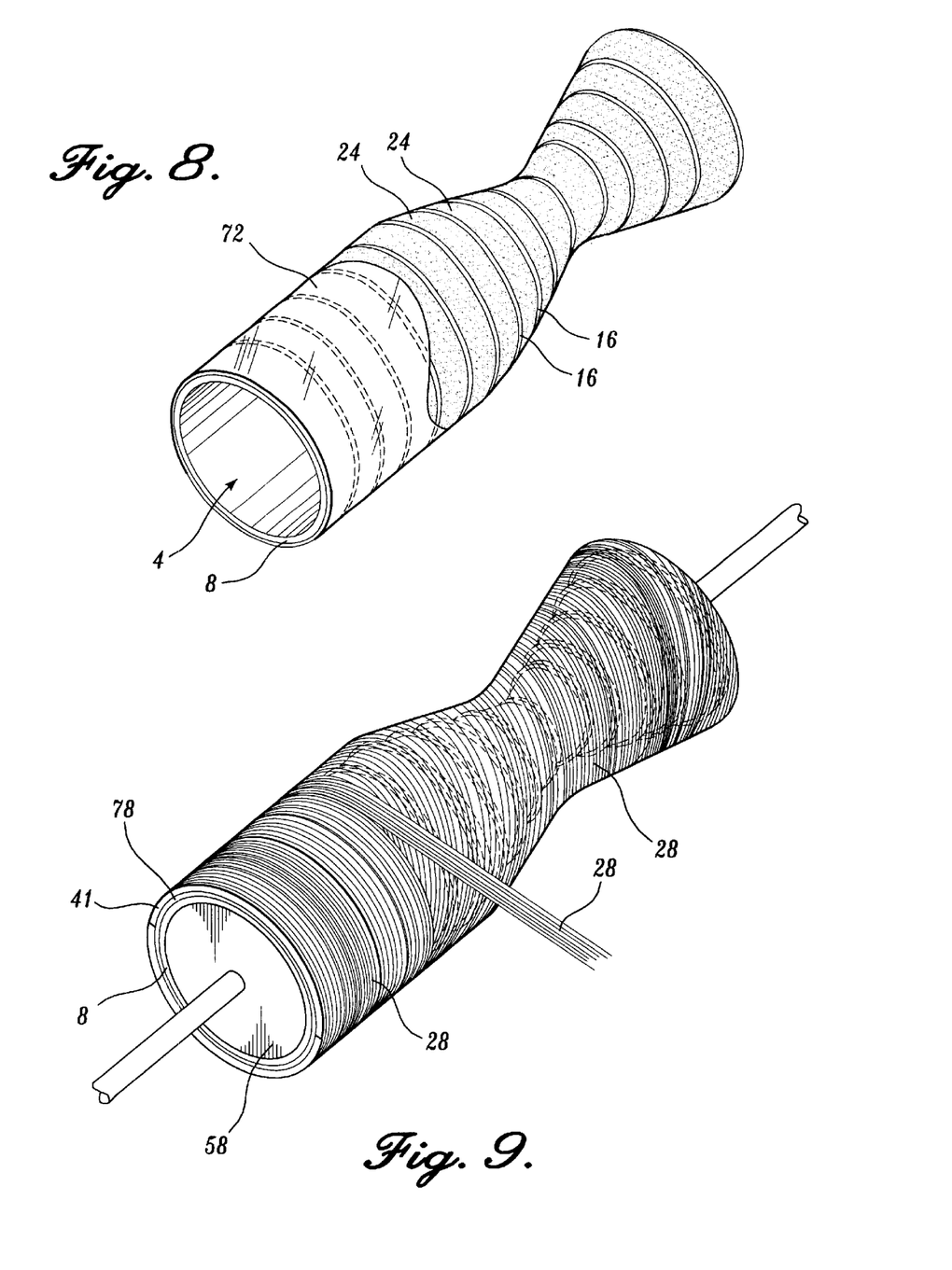
FIG. 8 is a perspective view of a channeled wall thrust nozzle liner formed in accordance with one embodiment of the present invention, showing the thrust nozzle liner with cured removable casting material in place, having a cut away view of the thin non-porous coating applied to the outer surfaces of the casting material and separation rib.
FIG. 9 is a perspective view of a channeled wall thrust nozzle formed in accordance with one embodiment of the present invention, showing application of an outer composite cooling jacket material.

Referring to FIG. 8, if split shells 12 are not desired, an appropriate mold release agent may be applied to the surface of the removable casting material 24 to resist the absorption of resin into the casting material 24. The mold release agent or other suitable material may be applied as a thin coat or film 72 on the outer surface of the solidified removable casting material 24. The thin coat or film 72 acts a barrier to resist impregnation of composite material or resin into the removable casting material 24. The contamination of resin into the casting material is to be avoided to preserve the precision surface for optimal fluid flow and to aid in the later removal of the casting material 24.

Returning to FIG. 7, the shells 12 are formed to substantially match the desired interior dimensions of the cooling jacket 6. Typically, the shells 12 are made from the male mandrels 62 described above in the same manner as the female molds Were produced, again as described above. The shells 12 may be formed using composite materials, although not limited to composite materials, to reduce manufacturing cost while maintaining precise dimensions. The shells 12 may have grooves or riblets 26 embedded in or protruding from the surface of the split shells 12 to provide boundary layer fluid control mechanisms 26 on the cooling channel 14 walls.

Still referring to FIG. 7, after the shells 12 are formed, they are placed into contact with the outer surfaces 56 of the separation rib 16 and the solidified removable casting material 24, thereby enshrouding the thrust nozzle 2. These shells 12 will be a permanent part of the thrust nozzle 2. The flexibility of the shells 12 allows for correct placement of the shells 12 in relation to the inner thrust nozzle liner 8, even in the case of an imprecise inner nozzle liner 8 or an imprecisely formed split shell 12. This process is robust in the real-world manufacturing environment in that it allows flexibility in tolerance requirements.

Now referring to FIG. 9, the complete unit, including the thrust nozzle liner 8 with the solidified casting material and the shells 12, is now ready for application of the final stage. In this stage, a layer of composite materials 28 is applied to the exterior surface of the shells 12. Although including the shells is preferred, it should be apparent that the composite material 28 can be applied directly to the surface of the hardened removable casting material 24 or the thin film or coat 72 covering the removable casting material 24 and, therefore, such an embodiment is also within the scope of the present invention.

During the application of composite material, a well known solid mandrel 58 may be temporarily inserted within the thrust nozzle liner 8 for increased rigidity of the liner during the manufacturing process. Such a mandrel 58 includes a longitudinal converging-diverging cross-section and a transverse cross section generally conforming to the geometry of inner surface of the thrust nozzle liner 8. The male mandrel 58 is transversely split at a narrow diameter, so that when inserted into interior void defined by the thrust nozzle liner 8, the male mandrel 58 can be split and removed.

Well known composite materials 28 are hand-laid, fiber-placed, filament wound, etc. to achieve the desired structural material design lay-up of the composite cooling jacket. In a non-limiting example, the composite cooling jacket 6 is made by wrapping the shell with a pre-impregnated carbon tow which is placed as a laminate, with lay-up angles on the outer shell optimized to carry the pressure hoop load, pressure axial load and thrust axial load. The strength to weight of the graphite tow is higher than steel in this directional application. The application of the composite materials 28 also entails the attachment of end-fittings 60 for structural reasons, such as to distribute loads and to provide attachment means, in addition to directing the flow of cooling fluid into and out of the cooling channels 14.

The composite materials 28 are cured. A non-limiting example of a cure cycle would entail vacuum bagging the entire part, putting it into an autoclave and ramping pressure and temperature until the composite materials are fully cured.

After the composite materials 28 have cured, the removable casting material, which still fills the fluid cooling channels 14, may be removed. Depending on the removable casting material utilized, different processes are used. For example, if Easy-Out™ water soluble casting plaster is used, water or soda water is used to hydrate and dissolve the removable casting material. If a casting wax is used, the thrust nozzle is heated above the melting point of the wax to cause the casting material to flow through the cooling channels 14. The removable casting material flows through the cooling channels 14 and out the end fittings 60 orifices. The process may be repeated to assure the complete removal of the casting material. It is also possible to use vibration or ultra-sonics to loosen the solidified casting material. It is also possible to use a long-flexible water pick or articulating (snaking) drill to facilitate removal of the solidified removable casting material.

The last stage of the process, depending on the choice of composite material 28 and removable casting material 24, is free-standing post-cure of the composite cooling jacket 6. The composite materials 28 may need to be held at elevated temperatures or pressures to reach a final cure state which is compatible with the operating conditions of the thrust nozzle 2. A non-limiting example is the use of a non-pre-impregnated graphite fiber with a room temp curing resin system, using a casting wax for a removable casting material 24. The free-standing post-cure may occur at 420 degrees Fahrenheit after wax melting and removal at 200 degrees Fahrenheit, thereby resulting in a thrust nozzle with a design operating temperature of 350 degrees Fahrenheit. The post-cure may be able to provide cross-linking of the matrix (resin) so that the composite cooling jacket 6 may be able to perform in design temperature and pressure environments.

Figure 10:
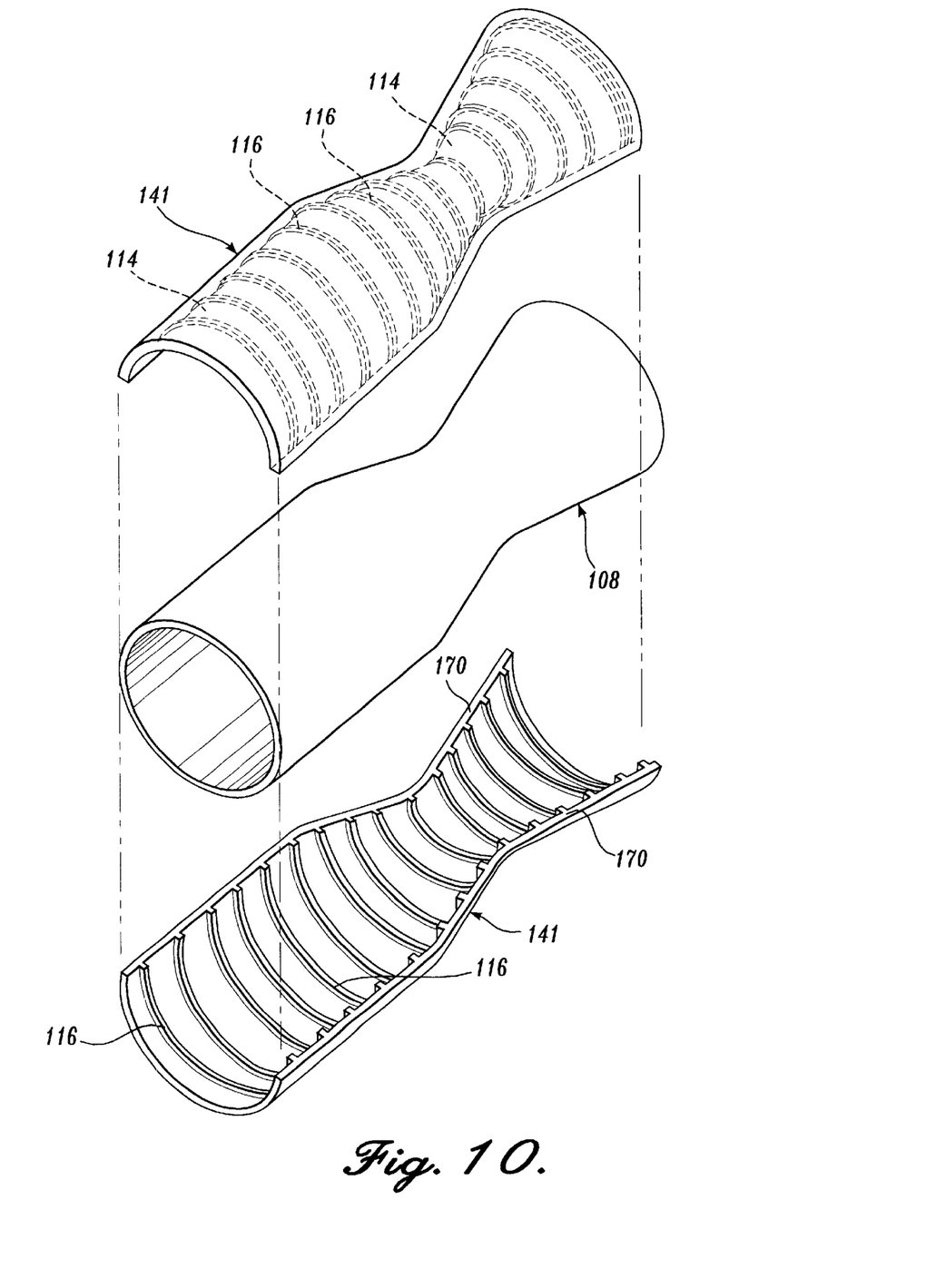
FIG. 10 is an exploded view of a channeled wall thrust nozzle formed in accordance with an alternative embodiment of the present invention, depicting the thrust nozzle liner prior to enclosure of the thrust nozzle liner with female molds having separation ribs.

Referring now to FIG. 10, a first alternative embodiment of a thrust nozzle 102 will now be described in greater detail. The thrust nozzle 102 of this alternate embodiment is identical in materials and operation to the preferred embodiment described above with one exception. In this embodiment, the separation ribs 116 attached to the shells 141, instead of attaching them to the thrust nozzle liner 8 as described in the previous embodiment.

This alternative method begins with using or creating an existing thrust nozzle liner 108. The thrust nozzle liner 108 may be made of any type of material. The thrust nozzle liner 108 will be a plain smooth shell or it may have grooves or riblets embedded in or protruding from the surface of the thrust nozzle liner 108 to provide boundary layer fluid control mechanisms for optimized coolant fluid flow, such as reduced drag and/or pressure drop.

As also in the previous embodiment, dimensionally stable split male mandrels are formed whose exterior surface matches the interior shape of the desired composite cooling jacket. Deep grooves are formed in the male mandrel that match the desired dimensions, such as width, thickness, length, angles, and others, of the separation ribs 116. The deep grooves allow for production of shells 141 having integral separation ribs 116. The male mandrels may also have shallow grooves or riblets embedded in or protruding from the surfaces of the male mandrels to provide boundary layer fluid control mechanisms on the inner surface of the ensuing shells 141 made from the male mandrels. In one embodiment, the shells are formed by applying composite materials to the exterior surface of the male mandrel 62 (FIG. 4B). The composite material is allowed to be cured and then separated from the male mandrel 62.

The separation ribs 116 may be bonded to or co-cured with the shells 141. It is possible to directly machine the shells 141 from many varying materials, but typically the shells 141 are produced from composites to reduce manufacturing cost while maintaining precise dimensions. The shells 141 may have grooves or riblets embedded in or protruding from the surface of the molds to provide boundary layer fluid control mechanisms on the inner surfaces of the cooling channels 114. These grooves or riblets may be machined or may be composite products from the male mandrels 62 casting process. The materials used in the lay-up of the split shell 141 surface may be different than the material utilized in forming the integral separation ribs 116 and cooling channels 114 during the ply lay-up sequence. For example, high temperature materials such as Phenolic or BMI, may be used in areas closer to the inner thrust nozzle liner 108 surface.

After the shells 141 are formed from the male mandrel, they can be removed and placed around the thrust nozzle liner 108 to enclose the thrust nozzle liner 108. Fluid cooling channels 114 are formed between the inner nozzle liner 108 and the split shells 141 with integral separation ribs 116.

Still referring to FIG. 10, the shells 141 with the integral separation ribs 116 that follow the shape of the inner thrust nozzle liner 108, are placed into contact and may be bonded to the thrust nozzle liner 108. A non-limiting example of the bonding would be using EA9394 room temperature curing adhesive to bond the ribs to the liner prior to final manufacturing and cure, or applying a thin film adhesive to the ribs that will bond to the liner during final cure. Continuous cooling channels 114 of a helical pattern are formed between the inner surface of the thrust nozzle liner 108 and the shells 141 with integral separation ribs 116. The flexibility of the shells 141 in this portion of the process may allow for correct placement of the shells 141 in relation to the inner nozzle liner 108 even in the case of an imprecise thrust nozzle liner 108 or an imprecisely formed shell 141. This process is robust in the real-world manufacturing environment since it provides flexibility in the tolerance requirements. The shells 141 with integral separation ribs 116 will be a permanent part of the composite cooling jacket structure.

A removable casting material is poured in the cooling channels formed between the shells 141, the thrust nozzle liner 108, and the ribs 116. The removable casting material flows into the cooling channels 114 and solidifies as discussed in the previous embodiment. As already noted, the nozzle of this alternate embodiment is u identical to the preferred embodiment described above with the one exception. As a result, the remainder of the process will not be described, but is identical to that described above.

In the alternative embodiment of the above method of manufacture, female molds 18 are used in conjunction with the shells 141 described above. The distinction between a female mold 18 and a shell 141 is slight. They both have similar dimensions and can be formed from the same male mandrel. The main distinction is that a shell 141 is intended to become a permanent structure of the thrust nozzle 2, while a female mold 18 is not intended to become a permanent structure of the thrust nozzle 2, being removed after curing of the removable casting material 24. The female molds 18, once removed, are replaced by a dimensionally similar shell 141 that will become a permanent structure of the thrust nozzle 2 once wrapped in a composite material 28 during the formation of the cooling jacket 106. Therefore, different materials or different designs can be used to form each that are best suited for their respective tasks.

Figure 11:
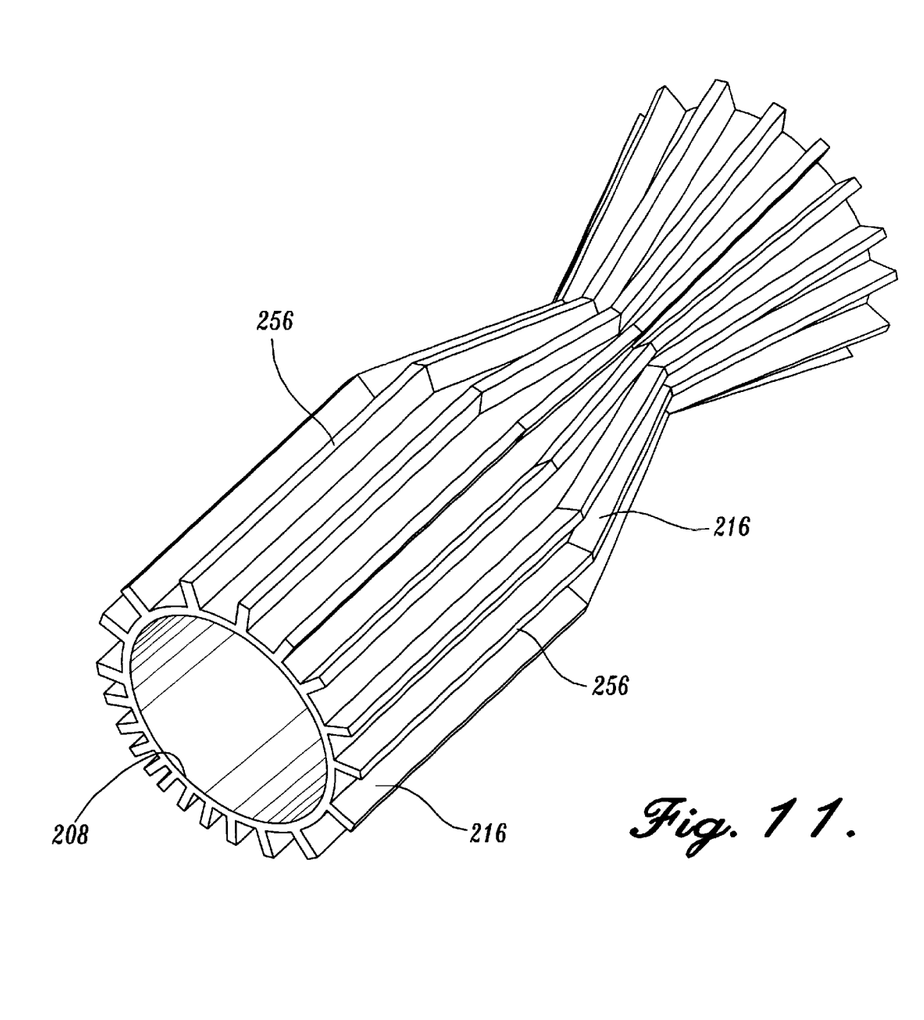
FIG. 11 is a perspective view of a channeled wall thrust nozzle formed in accordance with one embodiment of the present invention showing spaced parallel separation ribs.

Although the above described preferred embodiments all refer to helical separation ribs, this is intended to be a non-limiting preferred embodiment. In alternative embodiments, single or multiple separation ribs 116 can be utilized and oriented in a manner the user sees fit. Such designs, although not limited to, includes longitudinally or wavy rib separation patterns, or separation ribs having a multitude of non-connected or connected pillars or other geometric shapes. In FIG. 11, an alternate embodiment of a thrust nozzle 202 depicting a plurality of spaced parallel ribs 216, longitudinally located along the thrust nozzle liner 208, is shown. Such an embodiment is identical to that described above for the preferred embodiment with the foregoing exception.

Figure 12:
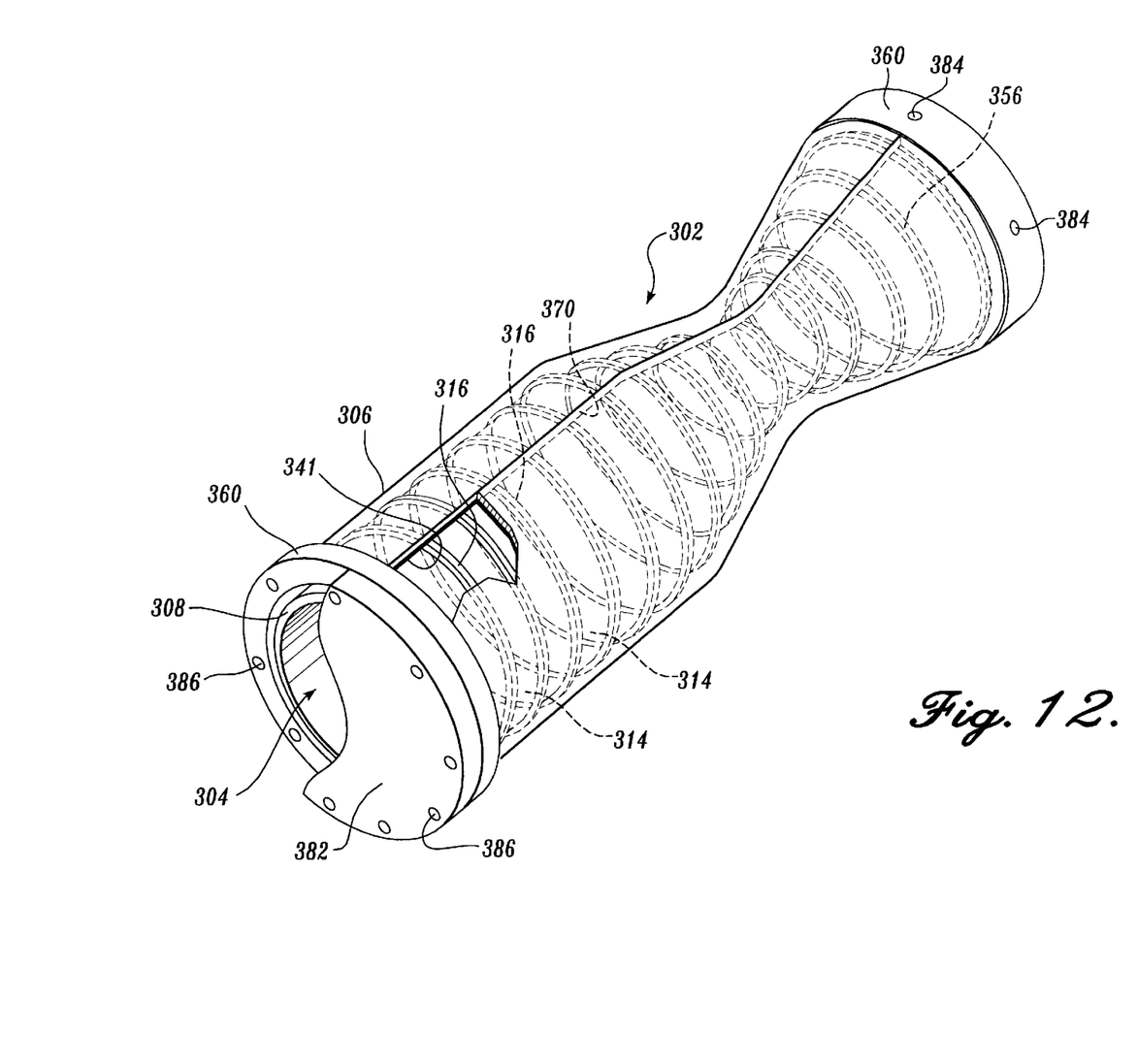
FIG. 12 is a perspective view of a channeled wall thrust nozzle formed in accordance with another embodiment of the present invention.

Referring now to FIG. 12, another alternate embodiment of manufacture will now be described in greater detail. In this alternate embodiment, the method of manufacture is identical to the preferred embodiment described above with the following exceptions. First, a gas at pressure is used as the removable casting material 24 to resist compression forces created during the manufacturing process. As previously described, if the ribs are integral with the shells, the ribs are bonded to the thrust nozzle liner. If the ribs are mechanically attached to the thrust nozzle liner, then the ribs are bonded to the interior surface of the shell. In this embodiment, the shells with ribs are either bonded or mechanically fastened together and to end fittings 360, after proper placement around a thrust nozzle liner 108.

The resulting structure is capable of being a pressure-tight vessel, capable of containing reasonable pressure differentials. Gas is directed into the space defined by the outer surface of the thrust nozzle liner 108 and the inner surface of the shells, and the fittings 360. The sealed gas provides the shell with the rigidity to resist deformation during the material placement and curing processes. This embodiment allows for the cooling channels 314 and ribs 316 to be formed with the use of a gaseous removable casting material that is removed with very little time or expense as compared to a solid or fluid removable casting material. Still referring to FIG. 12, the thrust nozzle 302 includes an end cap 382 sealingly fastened to one end of thrust nozzle 302 by well known fasteners 386. The end cap 382 seals the channel 314. The other end fitting 360 of the thrust nozzle 302 includes a pair of ports 384 in fluid communication with the channel 314. The ports 384 permits the introduction of the cooling fluids and/or introduction of the pressurizing fluid.

The specific method used in applying this alternative embodiment is as follows. The shells 341 with integrally formed ribs 316 are placed around the thrust nozzle liner 308. The two halves of the shell 341 are bonded using a room temperature curable epoxy resin, such as Dexter Hysol EA 9394, which has good high temperature properties. The shells 341 are glued or bonded at the interface locations between the shells. Additional bonding would then be performed between the shells 341 and the end fittings 360.

After a typically room temperature cure of the sealing bond, a gas pressure source would be connected to either the inlet or exit end-fitting 360 and the other end-fitting 360 would be sealed off by the end cap 382 so that a pressure vessel would be created. The fiber placement (braiding, tow placement, filament winding or hand lay-up) processes would then take place against this pressurized outer shell 341. After all composite material is placed, the thrust nozzle 302 would then be positioned in an autoclave, or a molded press that contours to the surface of the cooling jacket 306, where the exterior temperature and pressure are controlled for an optimum cure cycle. The pressure between the composite cooling jacket 306 and the thrust nozzle liner 308 is maintained at or above the autoclave pressure so that the geometry of the thrust nozzle is maintained during the curing process. As a nonlimiting example, an autoclave may be ramp up to 300 psi at 450° F. Similarly, the internal pressure between the inner surface, the cooling jacket 306, or shell 341 and the inlet and exit fittings 360, is maintained greater than or equal to 300 psi to maintain the structural integrity and geometry of the cooling jacket.

The last step in the process is to ramp the autoclave temperature and pressure cycles down at the same time as the pressurized gaseous removable casting material is expelled from the space between the composite cooling jacket 306 and the thrust nozzle liner 308. This step in the process entails venting the remaining gaseous removable casting material from the cooling channels 314. Although a gaseous removable casting material was shown and described in this embodiment, it will be understood that the process can be modified to utilize a removable casting material that is in any state of a fluid, including a liquid.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of producing a thrust nozzle, the method comprising the steps of:
   (a) forming a thrust nozzle liner having an outer surface and a length;
   (b) forming at least a first shell having an interior and an exterior surface;
   (c) providing at least one rib on one of either of the thrust nozzle liner or the first shell;
   (d) placing the first shell around the outer surface of the thrust nozzle liner, such that the at least one rib extends between the outer surface of the thrust nozzle liner and the interior surface of the first shell to form a gap therebetween;
   (e) inserting a removable casting material within the gap, wherein the removable casting material is a gas; and
   (f) removing the removable casting material from within the gap to form at least one channel extending at least a portion of the length of the thrust nozzle liner.

2. The method of claim 1, wherein the interior surface of the first shell that has been modified to provide boundary layer fluid control mechanisms in the at least one channel.

3. The method of claim 1, wherein the first shell is a structural member used to strengthen the thrust nozzle.

4. The method of claim 1, wherein the first shell is a non-structural member.

5. The method of claim 1, further comprising the step of applying a composite material to the exterior surface of the first shell.

6. The method of claim 1, wherein the at least one rib is integrally formed with the thrust nozzle liner.

7. The method of claim 1, wherein the at least one rib is integrally formed with the first shell.

8. The method of claim 1, further comprising the step of providing a plurality of ribs on one of either the thrust nozzle liner or the first shell.

9. A method of forming a thrust nozzle, the method comprising the steps of:
   (a) forming a thrust nozzle liner having an outer surface and a length;
   (b) forming at least a first shell having an interior surface and an exterior surface;
   (c) providing at least one spacer means on one of either the thrust nozzle liner or the first shell;
   (d) placing the first shell around the outer surface of the thrust nozzle liner, such that the at least one spacer means extends between the outer surface of the thrust nozzle liner and the interior surface of the first shell to form a gap therebetween;
   (e) inserting a removable casting material within the gap, wherein the removable casting material is a gas; and
   (f) removing the removable casting material from within the gap to form at least one channel extending at least a portion of the length of the thrust nozzle liner.

10. The method of claim 9, wherein the interior surface of the first shell has been modified to provide boundary layer fluid control mechanisms in the at least one channel.

11. The method of claim 9, further comprising the step of applying a composite material to the exterior surface of the first shell.

12. The method of claim 9, wherein the at least one spacer means is a rib integrally formed with the outer surface of the thrust nozzle liner.

13. The method of claim 9, further comprising the step of providing a plurality of spacer means on one of either the thrust nozzle liner or the first shell.

14. A method of manufacturing a channeled wall nozzle, the method comprising the steps of;
   (a) providing at least one spacer on one of either a nozzle liner or an interior surface of at least one shell, the nozzle liner having an exterior surface and a length;
   (b) placing at least one shell around the nozzle liner to form a gap between the at least one shell and the nozzle liner;
   (c) filling the gap with a removable casting material, wherein the removable casting material is a gas; and
   (d) removing the removable casting material to form at least one channel extending at least a portion of the length of the nozzle liner.

15. The method of claim 14, wherein a surface of the at least one shell has been modified to provide boundary layer fluid control mechanisms in the at least one channel.

16. The method of claim 14, wherein the at least one spacer is integrally formed with one of either the nozzle liner or the at least one shell.

17. A method of manufacturing a thrust nozzle, the method
   (a) providing at least one rib on an exterior surface of a nozzle liner having a length;
   (b) placing first and second shells around the nozzle liner to form a gap between the nozzle liner and the first and second shells;
   (c) filling the gap with a removable casting material, wherein the removable casting material is a gas; and
   (d) removing the removable casting material to form at least one channel extending at least a portion of the length of the nozzle liner.

18. The method of claim 17, further comprising the step of providing a plurality of ribs on the exterior surface of the nozzle liner.

19. The method of claim 17, wherein a surface of at least one of the first or second shells has been modified to provide boundary layer fluid control mechanisms in the at least one channel.

20. A method of manufacturing a channeled wall fluid control apparatus, the method comprising the steps of:
   (a) providing at least one rib on one of either a liner having a length or an interior surface of at least a first shell;
   (b) placing the first shell around the liner to form a gap between the first shell and the liner;

(c) inserting a removable casting material within the gap, wherein the removable casting material is a gas; and (d) removing the removable casting material from within the gap to form at least one channel extending at least a portion of the length of the liner.

21. The method of claim 20, wherein a surface of the first shell has been modified to provide boundary layer fluid control mechanisms.

22. The method of claim 21, further comprising the step of applying a composite material to an exterior surface of the first shell.

23. The method of claim 20, further comprising the step of providing a plurality of ribs on one of either the liner or an interior surface of the first shell.

* * * * *